US011369087B2

United States Patent
Smith et al.

(10) Patent No.: US 11,369,087 B2
(45) Date of Patent: Jun. 28, 2022

(54) REMOTE RELEASE BUCKLE

(71) Applicants: Jason Smith, Penrose, NC (US); Philip J. Hawkins, Asheville, NC (US); George Heddy, Hendersonville, NC (US)

(72) Inventors: Jason Smith, Penrose, NC (US); Philip J. Hawkins, Asheville, NC (US); George Heddy, Hendersonville, NC (US)

( * ) Notice: Subject to any disclaimer, the term of this patent is extended or adjusted under 35 U.S.C. 154(b) by 208 days.

(21) Appl. No.: 16/907,582

(22) Filed: Jun. 22, 2020

(65) Prior Publication Data

US 2020/0396964 A1 Dec. 24, 2020

Related U.S. Application Data

(60) Provisional application No. 62/864,053, filed on Jun. 20, 2019.

(51) Int. Cl.
*A01K 27/00* (2006.01)

(52) U.S. Cl.
CPC .......... *A01K 27/005* (2013.01); *A01K 27/003* (2013.01)

(58) Field of Classification Search
CPC .... A01K 27/005; A01K 27/00; A01K 27/001; A01K 27/002; A44B 11/253; A44B 11/2534; A44B 11/2592; Y10T 24/4566; Y10T 24/4567; Y10T 24/45728; Y10T 24/45738
See application file for complete search history.

(56) References Cited

U.S. PATENT DOCUMENTS

| 2012/0054993 A1* | 3/2012 | Anscher | A44B 11/2592 24/640 |
| 2018/0249682 A1* | 9/2018 | Brian | A01K 27/005 |

FOREIGN PATENT DOCUMENTS

| DE | 2027510 A1 * | 12/1971 |
| FR | 2523452 A1 * | 9/1983 |

* cited by examiner

*Primary Examiner* — Kristen C Hayes
(74) *Attorney, Agent, or Firm* — Averill & Green; Kenneth L. Green

(57) ABSTRACT

A buckle assembly includes a housing enclosing a locking bar for securing a latch. The latch is inserted into a latch cavity of the buckle assembly, pushing the spring-loaded locking bar into the housing until a convex feature of the latch passes a convex feature of the latch cavity, and slides to the side, whereupon the locking bar is extended by a compression spring, thereby locking the latch from release from the buckle assembly. The latch is released from the latch cavity by pulling a release cord or cable or trigger attached to the locking bar to overcome the spring tension and draw the locking bar up, thus allowing the latch to move away from the convex feature of the latch cavity and release from the buckle assembly.

19 Claims, 5 Drawing Sheets

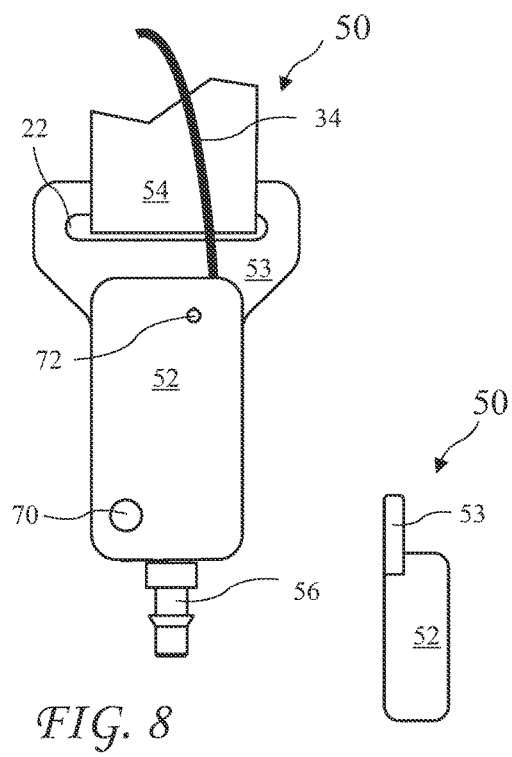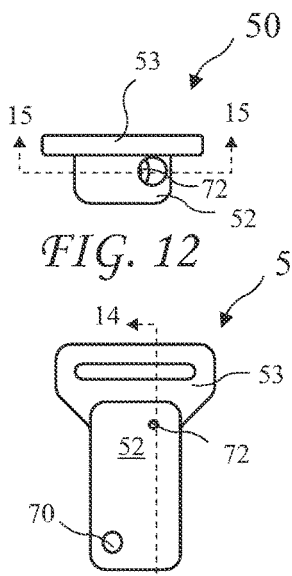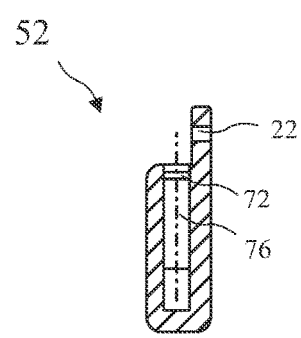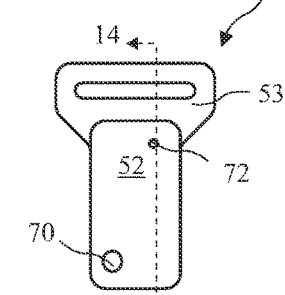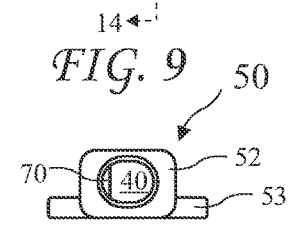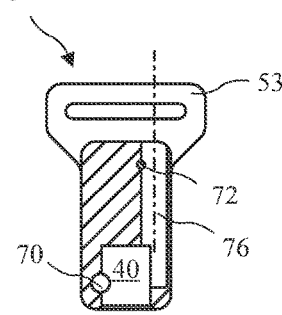

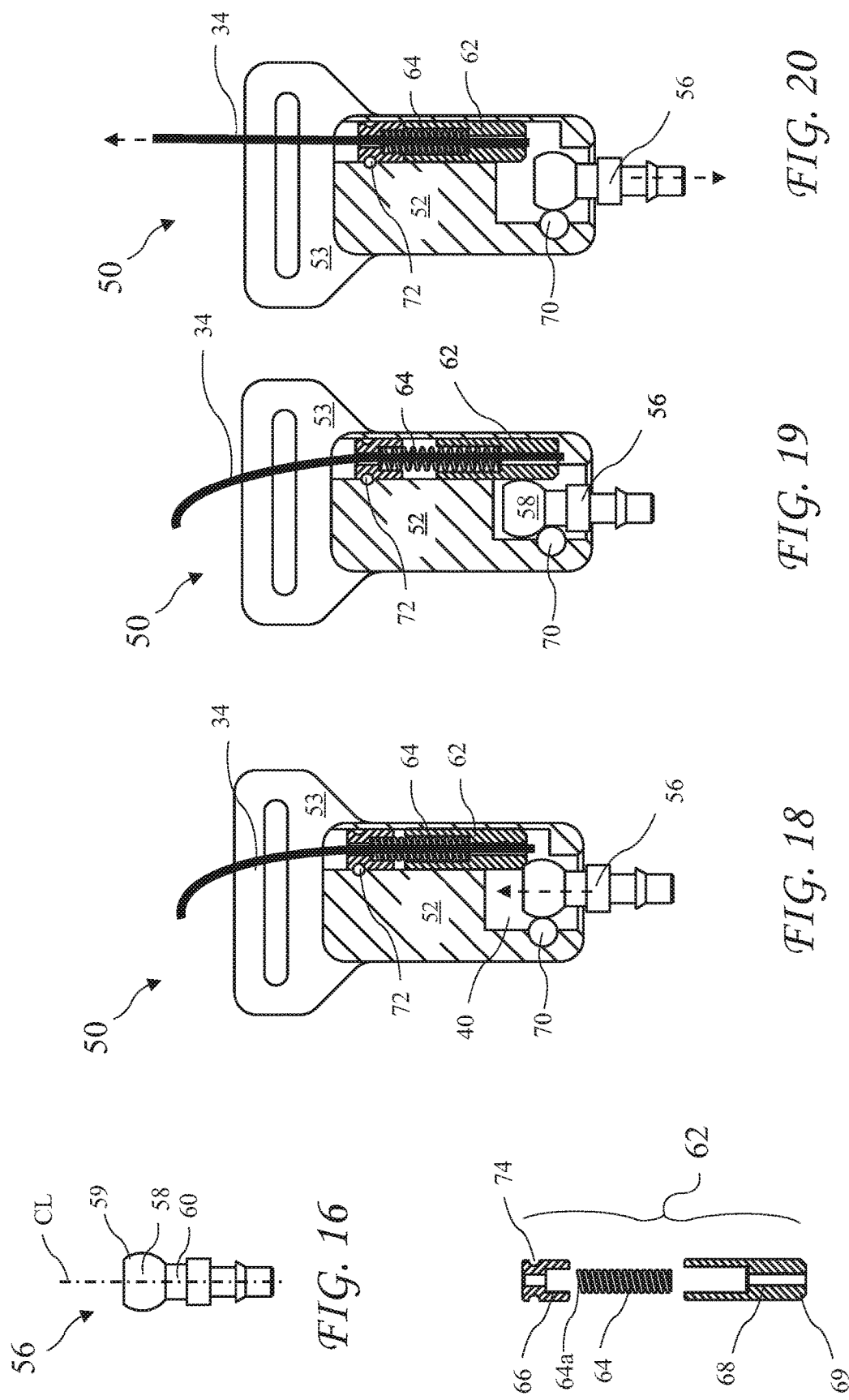

REMOTE RELEASE BUCKLE

CROSS-REFERENCE TO RELATED APPLICATIONS

The present application claims the priority of U.S. Provisional Patent Application Ser. No. 62/864,053 filed Jun. 20, 2019, which application is incorporated in its entirety herein by reference.

BACKGROUND OF THE INVENTION

The present invention relates to safety belt and harness releases and in particular to a remotely released harness.

There are often instances where a harness requires releasing but are not immediately accessible. Releasing animal leashes from collars generally require a handler to reach to a buckle attached to the collar, which is not always convenient or even possible. Merely releasing the leash results in the animal dragging the leash along with the animal, allowing the leash to be snagged by objects along the animal's path.

Vehicles generally include a belt or harness for restraining motion of occupants. The belts or harness generally include a buckle to retain individual elements, and the buckle must be released to allow the occupants to exit the vehicle. In some instances, it may be difficult for the occupant or rescue personnel to reach the buckle.

A need thus remains for apparatus to release a buckle without physically reaching the buckle.

BRIEF SUMMARY OF THE INVENTION

The present invention addresses the above and other needs by providing a buckle assembly including a housing enclosing a locking bar for securing a latch. The latch is inserted into a latch cavity of the buckle assembly, pushing the spring-loaded locking bar into the housing until a convex feature of the latch passes a convex feature of the latch cavity, and slides to the side, whereupon the locking bar is extended by a compression spring, thereby locking the latch from release from the buckle assembly. The latch is released from the latch cavity by pulling a release cord or cable or trigger attached to the locking bar to overcome the spring tension and draw the locking bar up, thus allowing the latch to move away from the convex feature of the latch cavity and be released from the latch cavity.

In accordance with one aspect of the invention, there is provided a buckle-style fitting which includes a housing, a locking bar, and a insertable and releaseable latch. The housing contains a latch block and the latch includes a convex portion which slide past the latch block, and then is urged laterally by a locking bar to overlap the latch block to retain the latch in the housing. A cord is attached to the locking bar, and allows a user to draw the locking bar away from the latch, allowing the latch to move laterally and withdraw from the housing.

In accordance with another aspect of the invention, there is provided a circular cross-section latch (circular cross sections of varying diameter along the length of the latch, forming a body of revolution about the centerline CL) which is a separate element inserted and removed from the housing assembly. The circular cross-section latch communicates with the blocking bar, pushing it out of the way until a convex portion of the circular cross-section latch passes a latch block in the housing, allowing a compression spring to return the blocking bar to its original location, thereby blocking the circular cross-section latch from removal from the housing assembly.

In accordance with still another aspect of the invention, there is provided a circular cross-section latch. The circular cross-section latch may rotate in the housing allowing the leash and housing to rotate with respect to an animal collar.

In accordance with yet another aspect of the invention, there is provided a circular cross-section latch attachable to an animal collar and a slot for attachment of a leash. The circular cross-section latch may be released by an animal handler without reaching to the collar.

In accordance with another aspect of the invention, there is provided a quick release by pulling on the cord or cable or trigger from either a near or far distance.

In accordance with still another aspect of the invention, there is provided a remote release buckle with a release cord or cable pulled to overcome the compression spring which retains the blocking mechanism, sliding it out of contact with the latch, thereby allowing the key to disconnect from its mating shape and slip out of the housing assembly. A release spring may be included to urge the latch out of the housing.

In accordance with another aspect of the invention, there is provided a remote release buckle providing a fitting with the ability to withstand expected statically applied load for 60-seconds without permanent deformation, yet retain its other requirements of functional significance.

In accordance with yet another aspect of the invention, there is provided a remote release buckle including a buckle fitting with the ability to positively engage itself such that the buckle cannot appear to be engaged when in actuality it is partially engaged or not engaged, preventing inadvertent release upon crash or fall.

BRIEF DESCRIPTION OF THE SEVERAL VIEWS OF THE DRAWING

The above and other aspects, features, and advantages of the present invention will be more apparent from the following more particular description thereof, presented in conjunction with the following drawings wherein:

FIG. 8 shows a front view of a second embodiment of a remotely releaseable buckle assembly, according to the present invention.

FIG. 9 show a front view of a housing of the second embodiment of the remotely releaseable buckle assembly, according to the present invention.

FIG. 10 show a left side view of the housing of the second embodiment of the remotely releaseable buckle assembly, according to the present invention.

FIG. 11 show a right side view of the housing of the second embodiment of the remotely releaseable buckle assembly, according to the present invention.

FIG. 12 show a top view of the housing of the second embodiment of the remotely releaseable buckle assembly, according to the present invention.

FIG. 13 show a bottom view of the housing of the second embodiment of the remotely releaseable buckle assembly, according to the present invention.

FIG. 14 shows a cross-sectional view of the housing of the second embodiment of the remotely releaseable buckle assembly, according to the present invention taken along line 14-14 of FIG. 9.

FIG. 15 shows a cross-sectional view of the housing of the second embodiment of a remotely releaseable buckle assembly, according to the present invention taken along line 15-15 of FIG. 12.

FIG. 16 shows a side view of a circular cross-section latch of the second embodiment of the remotely releaseable buckle assembly, according to the present invention.

FIG. 17 is an exploded view of a second locking bar of the second embodiment of the remotely releaseable buckle assembly, according to the present invention.

FIG. 18 is a front view of the circular cross-section latch partially inserted into the second embodiment of the remotely releaseable buckle assembly, according to the present invention.

FIG. 19 is a front view of the circular cross-section latch fully inserted into the second embodiment of the remotely releaseable buckle assembly according to the present invention.

FIG. 20 is a front view of the circular cross-section latch partially released from the second embodiment of the remotely releaseable buckle assembly, according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, and is within 10% of a stated value unless otherwise defined.

Figure 1:
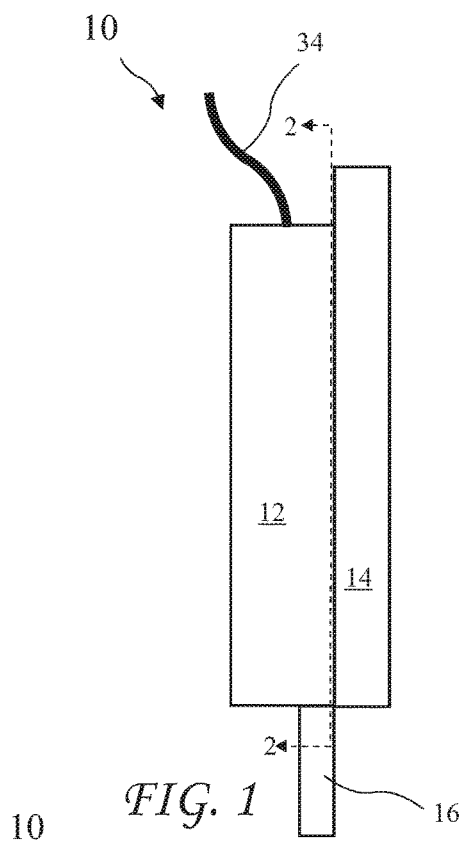
FIG. 1 is a side view of a remotely releaseable buckle assembly, according to the present invention.

A side view of a first embodiment of a remotely releaseable buckle assembly 10 according to the present invention is shown in FIG. 1. The buckle assembly 10 includes a major housing portion 12 and a housing cover 14. A keyed flat latch 16 is inserted into the buckle assembly 10 and a release cord or cable or trigger 34 extends out of the buckle assembly 10 for releasing the latch 16.

Figure 2:
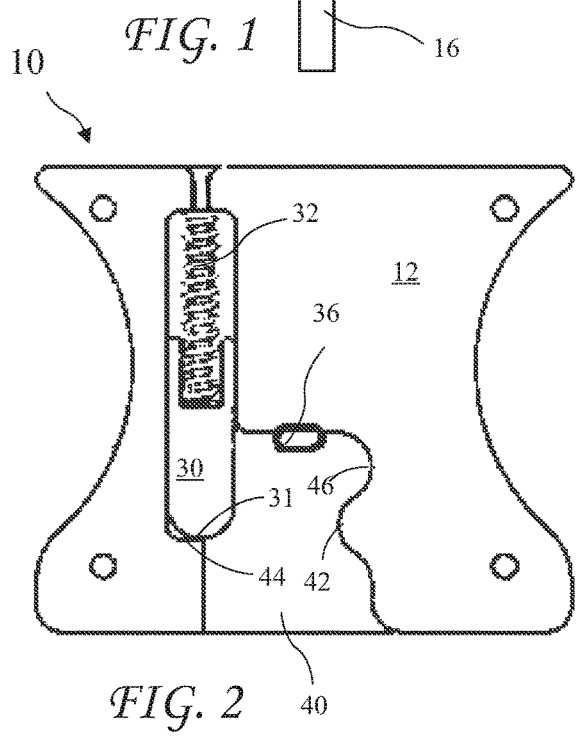
FIG. 2 is a front view of the major portion, the housing, of the remotely releaseable buckle, according to the present invention.

A front view of the major housing 12 is shown in FIG. 2 taken along line 2-2 of FIG. 1. The major housing portion 12 contains a sliding blocking bar 30, a compression spring 32 pressing the blocking bar 30 into the major housing portion 12. A latch cavity 40 receives the keyed flat latch 16 and a release spring 36 pushes down on the keyed flat latch 16 when residing in the latch cavity 40. The blocking bar 30 includes a tapered or rounded nose 31 and the latch cavity 40 includes an interior rounded bump 42 facing the blocking bar 30 and an interior corner 44 under the blocking bar 30.

Figure 3:
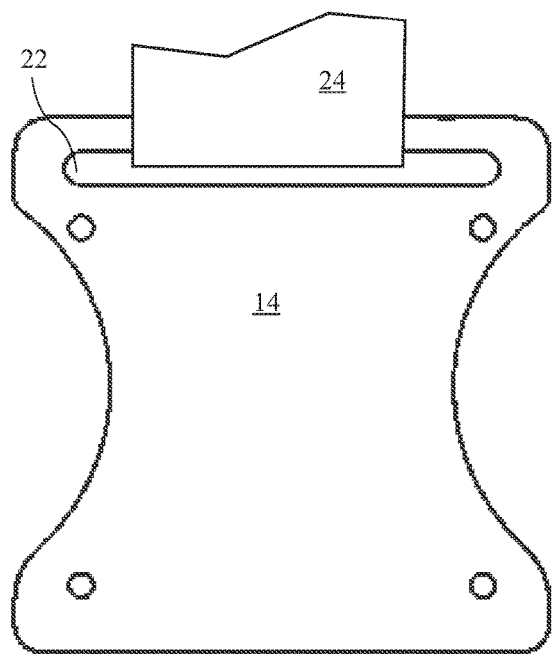
FIG. 3 is a front view of the other portion, the cover of the housing, for the remotely releaseable buckle, according to the present invention.

A front view of the housing cover 14 is shown in FIG. 3. The housing cover 14 is attached to the major housing portion 12 to assemble the buckle assembly 10. A belt slot 22 is provided to allow attachment of a first belt 24.

Figure 4:
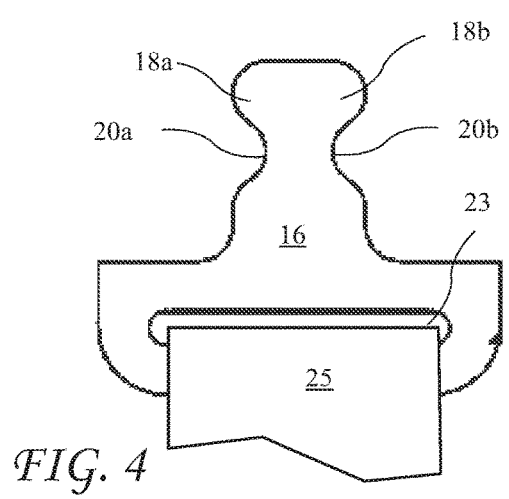
FIG. 4 is a front view of the 2-dimensional keyed flat latch of the remotely releaseable buckle assembly, according to the presently considered first embodiment of the invention, according to the present invention.

A front view of the keyed flat latch 16 is shown in FIG. 4. The keyed flat latch 16 includes pairs of left and right laterally symmetrical rounded bumps 18a and 18b and pairs of left and right laterally symmetrical recesses 20a and 20b below the bumps 18a and 18b. Keyed flat latch 16 is insertable into the buckle assembly 10 latch cavity 40 sliding diagonally up and to the left between the corner 44 and the bump 42. A second belt slot 23 is provided to allow attachment of a second belt 25. The belts 24 and 25 are preferably mating parts of a seat belt or other safety harness straps.

Figure 5:
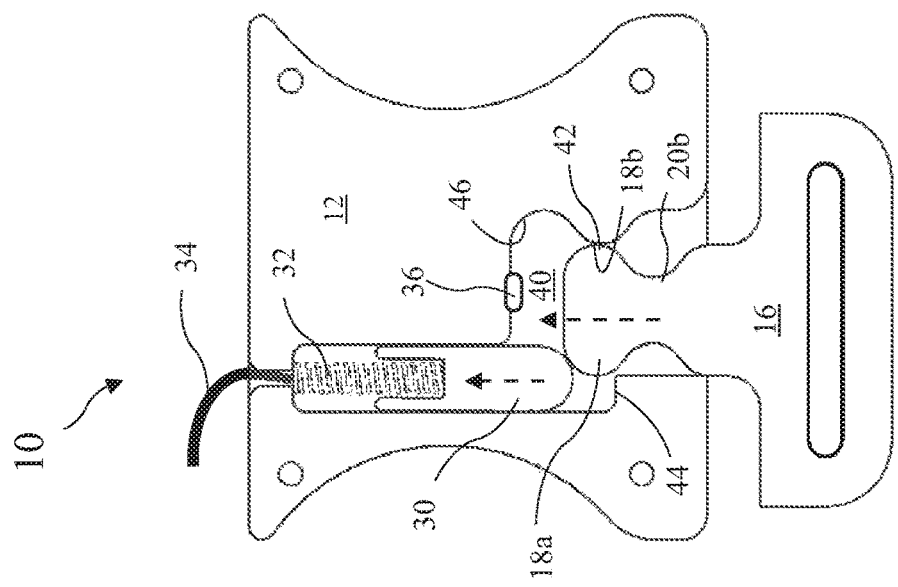
FIG. 5 is a front view of the keyed flat latch partially inserted into the remotely releaseable buckle assembly, according to the present invention.

A front view of the keyed flat latch 16 partially inserted into the remotely releaseable buckle assembly 10 is shown in FIG. 5. The left side rounded bump 18a (see FIG. 4) lifts the blocking bar 30 compressing the spring 32.

Figure 6:
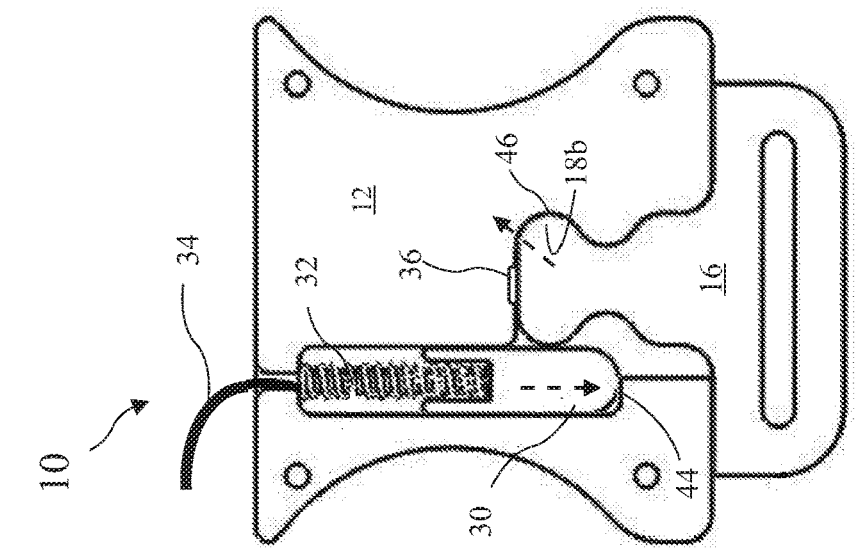
FIG. 6 is a front view of the keyed flat latch fully inserted into the remotely releaseable buckle assembly, according to the present invention.

A front view of the keyed flat latch 16 fully inserted into the remotely releaseable buckle assembly 10 is shown in FIG. 6. In this position the release spring 36 is compressed by the keyed flat latch 16. The right side bump 18b sides past the interior bump 42 and to the right with the left side bump 18a passing the blocking bar 30 allowing the blocking bar 30 to slide down. In this position, the blocking bar 30 holds the keyed flat latch 16 to the right with the right bump 18b engaging a cavity recess 46 to retain the keyed flat latch 16 in the remotely releaseable buckle assembly 10. In this position the release spring 36 is compressed by the keyed flat latch 16.

Figure 7:
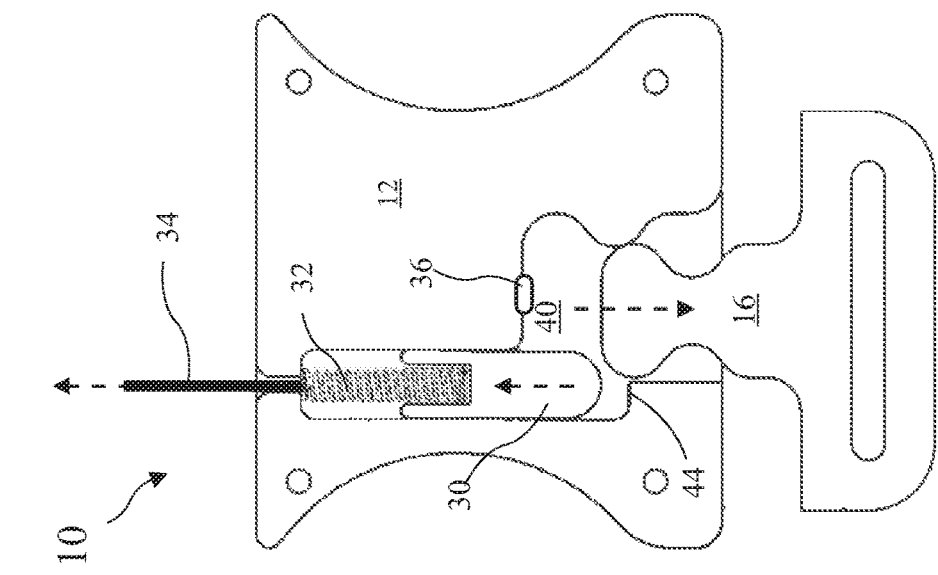
FIG. 7 is a front view of the keyed flat latch partially released from the remotely releaseable buckle assembly, according to the present invention.

A front view of the keyed flat latch 16 partially released from the remotely releaseable buckle assembly 10 is shown in FIG. 7. The release cord or cable or trigger 34 has been pulled, lifting the blocking bar 30 above the left bump 18a allowing the keyed flat latch 16 to move left and down.

A front view of a second embodiment of the invention is a remotely releaseable buckle assembly 50 shown in FIG. 8. The buckle assembly 50 includes a housing 52, a leash plate 53, a bar pin 72, a latch block 70, a cord 34, and a leash 54 through a slot 22 engaging the leash plate 53. A circular cross-section latch 56 is released by pulling the cord 34. The circular cross-section latch 56 may be attached to an animal collar and the cord 34 may be retained to run along the leash 54 allowing a user holding the leash to release the circular cross-section latch 56 by pulling the cord 34. The latch block 70 is preferably a cylindrical rod pressed into the housing A front view of the housing 52 of the buckle assembly 50 is shown in FIG. 9, a left side view of the housing 52 is shown in FIG. 10, a right side view of the housing 52 is shown in FIG. 11, a top view of the housing 52 is shown in FIG. 12, and a bottom view of the housing 52 is shown in FIG. 13. The leash plate 53 is attached to the housing 52. The bar pin 72 pressed into or through the housing 52 intrudes partially into a bar passage 76 (see FIGS. 14,15). A latch cavity 40 receives the circular cross-section latch 56 and a latch block pin 70 is pressed into or through the housing 52 so it intrudes partially into the latch cavity 40.

While a press-in bar pin 72 retaining the top 66 of the locking bar 62 is described above, those skilled in the art will recognize that any suitable means may be used to retain the spring at the top. The top 66 FIG. 17 could be pressed in, screw-in, set-screw retained, retained by deforming the housing, epoxied in place or retained with another adhesive, welded, retained using bayonet pins, using the housing by having the hole diameter sharply decrease forming a step, and inserting the compression spring and blocking bar from the other end during assembly, and sealing with a plug, the plug having an option of all of the above retaining methods, etc. A remote release buckle 50 including any means of retaining the blocking bar 62 and compression spring 64, or a spring top 64a of the compression spring 64, within the housing 52, is intended to come within the scope of the present invention.

A cross-sectional view of the housing 52 taken along line 14-14 of FIG. 9 is shown in FIG. 14 and a cross-sectional view of the housing 52 taken along line 15-15 of FIG. 12 is shown in FIG. 15. The bar pin 72 intrudes into the bar passage 76 to retain a top (a spring retainer) 66 and hence the locking bar 62 (see FIGS. 17-20).

A side view of a circular cross-section latch 56 of the second embodiment, the buckle assembly 50, is shown in FIG. 16. The circular cross-section latch 56 preferably has a round cross-section to allow the circular cross-section latch to rotate in the latch cavity 40 allowing the leash 54 and buckle assembly 50 to rotate with respect to an animal collar. The circular cross-section latch 56 includes a convex top portion 58 and a concave center portion 60 below the convex top portion 58. The convex top portion 58 has an inward and upward tapered shoulder 59. The latch 56 further defines a centerline CL.

An exploded view of a second locking bar 62 of the buckle assembly 50 is shown in FIG. 17. The second locking bar 62 includes three parts, a top 66 including a circumferential groove 74, a bottom 68, and a compression spring 64 between the top 66 and bottom 68 urging the top 66 and bottom 68 apart. The bottom 68 has an inward and downward tapered base 69.

A front view of the circular cross-section latch 56 partially inserted into the latch cavity 40 in a partially inserted position is shown in FIG. 18. The circular cross-section latch 56 must move to the right to pass the latch block pin 70 and pushed the locking bar 62 up compressing the spring 64. The bar pin 72 engages the pin slot 74 in the top 66 of the locking bar 62 preventing the top 66 from moving. The bar pin 72 is preferably a cylindrical pin pressed into the housing.

A front view of the circular cross-section latch 56 fully inserted into the latch cavity 40 in a fully inserted position is shown in FIG. 19. The convex portion 58 of the circular cross-section latch 56 is now past the latch block pin 70 and the inward and downward tapered or rounded base 69 of the locking bar 62 bears against the inward and upward tapered shoulder 59 of the circular cross-section latch 56 urging the circular cross-section latch 56 to move to the left, allowing the locking bar 62 to slide down and hold the circular cross-section latch 56 in a latched position.

A front view of the circular cross-section latch 56 partially released from the latch cavity 40 in a released position is shown in FIG. 20. The locking bar 62 is lifted by the cord 34 allowing the circular cross-section latch 56 to move to the right past the latch block pin, and release from the buckle assembly 50.

Figure 21:
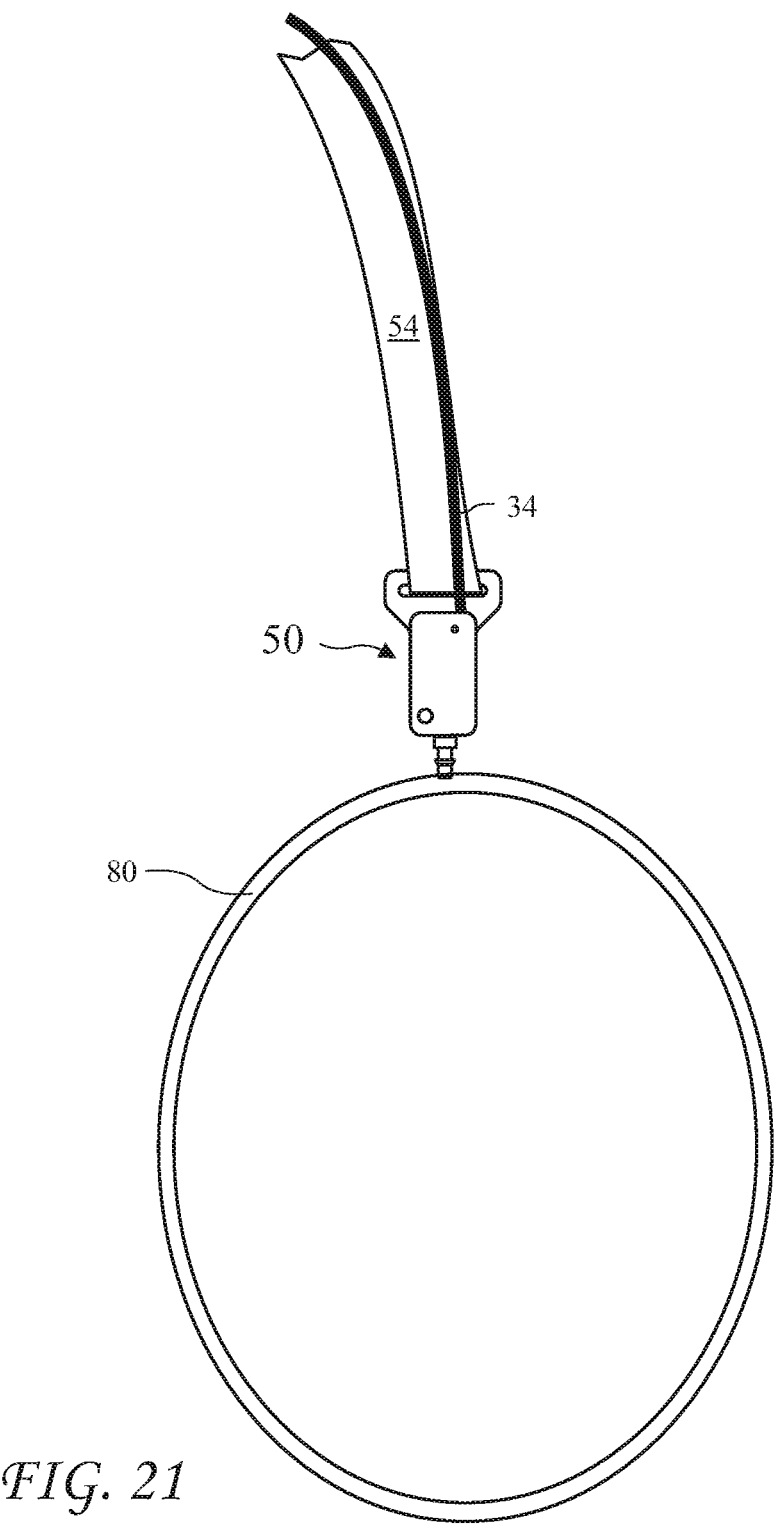
FIG. 21 shows the remotely releaseable buckle assembly attached to an animal collar, according to the present invention.

The remotely releaseable buckle assembly 50 and leash 54 are shown attached to an animal collar 80 in FIG. 21. The remotely releaseable buckle assembly 50 allows an animal handler to easily release an animal without having to reach to the collar 80.

While the invention herein disclosed has been described by means of specific embodiments and applications thereof, numerous modifications and variations could be made thereto by those skilled in the art without departing from the scope of the invention set forth in the claims.

We claim:

1. A remotely releaseable buckle assembly comprising:
   a housing;
   a latch having a convex portion and a concave recess under the convex portion;
   a latch cavity in the housing open at a first end to receive the latch;
   a bar passage in the housing intersecting the latch cavity;
   a blocking bar disposed within the bar passage;
   a convex surface in the latch cavity extending laterally towards the bar passage; and
   a release cord or cable or trigger attached the blocking bar and extending from the housing;
   wherein:
      in a partially inserted position, the latch residing in the latch cavity to a first lateral position wherein the convex portion is adjacent to the convex surface in the latch cavity and entering a portion of the bar passage, and the blocking bar is vertically held up into the bar passage by the latch;
      in a fully inserted position, the latch positioned laterally upward and away from the blocking bar from the partially inserted position inside the latch cavity to have a second lateral position wherein at least part of the convex portion is above and overlapping the convex surface in the latch cavity, and the blocking bar resides beside the convex portion of the latch retaining the at least part of the convex portion overlapping the convex surface in the latch cavity; and
      in a released position, the blocking bar is held upward by the release cord or cable or trigger and the latch has moved laterally towards the bar passage and away from the convex surface in the latch cavity and the latch is free to move vertically inside the latch cavity.

2. The buckle assembly of claim 1, further including a compression spring biasing the blocking bar into the latch cavity.

3. The buckle assembly of claim 2, wherein:
   the compression spring resides on top of a vertically sliding bottom of the blocking bar; and
   a spring top of the compression spring is restrained to not move up in the bar passage.

4. The buckle assembly of claim 2, wherein the compression spring resides between a fixed top of the blocking bar and a vertically sliding bottom of the blocking bar.

5. The buckle assembly of claim 2, wherein the compression spring resides between a top of the blocking bar and a vertically sliding bottom of the blocking bar and a bar pin reaches through the bar passage engaging a recess in the top of the blocking bar.

6. The buckle assembly of claim 5, wherein the bar pin is a cylindrical pin pressed into the housing.

7. The buckle assembly of claim 1, wherein the convex surface in the latch cavity has a circular cross-section.

8. The buckle assembly of claim 7, wherein the convex surface in the latch cavity is created by a cylindrical rod pressed into the housing.

9. The buckle assembly of claim 1, wherein the convex portion of the latch has a circular cross-section about a centerline (CL).

10. The buckle assembly of claim 9, wherein the latch can rotate about the centerline (CL) in any position in the latch cavity.

11. The buckle assembly of claim 9, wherein the concave recess of the latch has a circular cross-section about the centerline (CL).

12. The buckle assembly of claim 1, wherein the latch can rotate about a centerline (CL) in any position in the latch cavity.

13. The buckle assembly of claim 1, wherein in the fully inserted position the latch compresses a release spring.

14. The buckle assembly of claim 1, wherein in use the latch is attached to an animal collar.

15. The buckle assembly of claim 1, wherein the latch is flat.

16. The buckle assembly of claim 1, wherein the housing is a two piece housing with a removable cover.

17. The buckle assembly of claim 1, wherein a first belt of a seat belt is attached to the latch and a second belt of the seat belt is attached to the housing.

18. A remotely releaseable buckle assembly comprising:
a housing;
a circular cross-section latch having a convex portion and a concave recess under the convex portion;
a latch cavity in the housing open at a first end to receive the latch;
a bar passage in the housing intersecting the latch cavity;
a blocking bar disposed within the bar passage and a top held in a fixed position by a bar pin pressed into the housing and having a bottom including a tapered or rounded nose and biased into the latch cavity, the bottom biased towards the latch cavity by a spring residing between the top and the bottom;
a cylindrical rod pressed into the housing creating a convex surface in the latch cavity extending laterally towards the bar passage;
a cord attached the bottom of blocking bar and extending through the top of the blocking bar and from the housing; and
the latch attached to an animal collar,
wherein:
in a partially inserted position, the latch residing in the latch cavity to a first lateral position wherein the convex portion is adjacent to the convex surface in the latch cavity and entering a portion of the bar passage, and the blocking bar is vertically held up into the bar passage by the latch;
in a fully inserted position, the latch positioned laterally upward and away from the blocking bar from the partially inserted position inside the latch cavity to have a second lateral position wherein at least part of the convex portion is above and overlapping the convex surface in the latch cavity, and the blocking bar resides beside the convex portion of the latch retaining the at least part of the convex portion overlapping the convex surface in the latch cavity; and
in a released position, the blocking bar is held upward by the release cord or cable or trigger and the latch has moved laterally towards the bar passage and away from the convex surface in the latch cavity and the latch is free to move vertically inside the latch cavity.

19. A remotely releaseable buckle assembly comprising:
a major housing portion;
a removable cover attached to the major housing portion;
a flat, elongated rectangular cross-section, latch with edges viewed in the planform view having a convex portion and a concave recess under the convex portion;
a latch cavity in the major housing portion open at a first end to receive the latch;
a bar passage in the major housing portion intersecting the latch cavity;
a blocking bar having a tapered or rounded nose and disposed within the bar passage;
a convex surface in the latch cavity extending laterally towards the bar passage;
a spring biasing the blocking bar towards the latch cavity;
a cord attached the blocking bar and extending through the spring and from the major housing portion;
a first belt of a seat belt attached to the latch; and
a second belt of the seat belt attached to the major housing portion or the cover,
wherein:
in a partially inserted position, the latch residing in the latch cavity to a first lateral position wherein the convex portion is adjacent to the convex surface in the latch cavity and entering a portion of the bar passage, and the blocking bar is vertically held up into the bar passage by the latch;
in a fully inserted position, the latch positioned laterally upward and away from the blocking bar from the partially inserted position inside the latch cavity to have a second lateral position wherein at least part of the convex portion is above and overlapping the convex surface in the latch cavity, and the blocking bar resides beside the convex portion of the latch retaining the at least part of the convex portion overlapping the convex surface in the latch cavity; and
in a released position, the blocking bar is held upward by the cord and the latch has moved laterally towards the bar passage and away from the convex surface in the latch cavity and the latch is free to move vertically inside the latch cavity.

* * * * *